May 16, 1967 F. STEINER ETAL 3,320,364

SYSTEM FOR PHASE CODING INFORMATION BY BLANKING HALF CYCLES OF A CONTINUOUS PERIODIC WAVE

Filed June 3, 1963 6 Sheets-Sheet 1

INVENTORS
FRITZ STEINER
BERNHARD KUTZ
GÜNTER LEICHTER

BY [signature]

ATTORNEY

May 16, 1967 F. STEINER ETAL 3,320,364

SYSTEM FOR PHASE CODING INFORMATION BY BLANKING HALF CYCLES OF A CONTINUOUS PERIODIC WAVE

Filed June 3, 1963 6 Sheets-Sheet 2

INVENTORS
FRITZ STEINER
BERNHARD KUTZ
GÜNTER LEICHTER

BY

ATTORNEY

May 16, 1967 F. STEINER ETAL 3,320,364

SYSTEM FOR PHASE CODING INFORMATION BY BLANKING HALF CYCLES OF A CONTINUOUS PERIODIC WAVE

Filed June 5, 1963 6 Sheets-Sheet 3

INVENTORS
FRITZ STEINER
BERNHARD KUTZ
GÜNTER LEICHTER

BY [signature]

ATTORNEY

May 16, 1967 F. STEINER ETAL 3,320,364

SYSTEM FOR PHASE CODING INFORMATION BY BLANKING HALF CYCLES OF A CONTINUOUS PERIODIC WAVE

Filed June 3, 1963 6 Sheets-Sheet 4

INVENTORS
FRITZ STEINER
BERNHARD KUTZ
GÜNTER LEICHTER

BY Isidore Togut
ATTORNEY

INVENTORS
FRITZ STEINER
BERNHARD KUTZ
GÜNTER LEICHTER
BY
ATTORNEY

INVENTORS
FRITZ STEINER
BERNHARD KUTZ
GÜNTER LEICHTER
BY Isidore Togut
ATTORNEY

United States Patent Office 3,320,364
Patented May 16, 1967

3,320,364

SYSTEM FOR PHASE CODING INFORMATION BY BLANKING HALF CYCLES OF A CONTINUOUS PERIODIC WAVE

Fritz Steiner, Pforzheim, Bernhard Kutz, Stuttgart, Weilimdorf, and Günter Leichter, Korntal, Wurttemberg, Germany, assignors to International Standard Electric Corporation, New York, N.Y., a corporation of Delaware Filed June 3, 1963, Ser. No. 284,930
Claims priority, application Germany, June 7, 1962, St 19,333
19 Claims. (Cl. 178—67)

For the transmission of information by means of radio frequency energy a number of modulation methods are known. For example, the amplitude of a carrier wave can be modified by the amplitude of the information (amplitude modulation). Further, the frequency of the carrier wave can be varied by the amplitude of the information (frequency modulation). It is further known to derive pulses from an unmodulated carrier wave whereby the spacing of the pulses from each other corresponds to the information (basic principle of the pulse modulation). There is a number of modifications of this latter method (PPM, PCM, etc.). It is further known to transmit the information as pulses in parallel- or serial-coded form. An example of such coded information is the Morse- or the teleprinter-code. These codes consist of a series of mark and space signals. Each mark includes a relatively large number of full cycles of a periodic wave, whereas the periodic wave is cancelled in the space period. A further transmission method is to use different frequencies for space and mark signals (two-frequency method), wherein each character comprises a large number of full cycles of a periodic wave.

The invention relates to the transmission of information within a continuous periodic wave by means of a serial code in which, according to the invention, given half cycles of the periodic wave are employed to define the mark and space signals of a binary code, or the three conditions of a ternary code.

The disadvantages of known methods described above are that a considerably large bandwidth is required for the transmission due to abrupt change in amplitude or frequency.

If only relatively small information contents have to be transmitted the bandwidth required for such methods would be uneconomical. Furthermore, a transmission method may be of interest for many objects in which the energy content of the transmitted blanked periodic wave remains nearly constant when the information content is changed. Such operation is advantageous, if a fault detection in a communication channel is required by monitoring the received carrier wave energy, or if the carrier wave shall simultaneously be used to control the level, or if the information shall be impressed on a wave of limited duration which simultaneously is utilized for other purposes, e.g. for range determination by measuring the propagation time of the waves.

According to one aspect of the invention a serial code character is represented in a continuous periodic sine wave by varying the shape or blanking a positive half cycle of the sine wave to indicate a mark signal and a negative half cycle of the sine wave to indicate a space signal, where the mark and space signals are each time coincident and coextensive with a full cycle of the sine wave, so that the continuous periodic sine wave can be reestablished by filters or other simple resonant circuits to aid in the recovery of the serial code character. It is to be understood that the shaping or blanking of a positive half cycle can indicate a space signal and that the shaping and blanking of a negative half cycle can indicate a mark signal.

According to another aspect of the invention a mark signal can be represented by shaping or blanking either a positive or negative half cycle of the continuous periodic sine wave and a space signal can be represented by leaving unaltered a full cycle of the sine wave, or vice versa.

Still another aspect of the invention relates to serial ternary codes where one condition thereof is indicated by shaping or blanking a negative half cycle of a continuous periodic sine wave, a second condition thereof is indicated by shaping or blanking a positive half cycle of the sine wave, and the third condition thereof is indicated by leaving unaltered either a positive or a negative half cycle of the sine wave, or any other possible combinations of conditions of the half cycles of the sine wave to represent the three conditions of the ternary code. In this arrangement, the code conditions of the terniary code would be time coincident and extensive with the appropriate half cycles of the sine wave.

To illustrate generally the principle involved in the invention reference is made to the following description in conjunction with the accompanying drawings, wherein:

FIG. 1 shows various waveforms, viz.:

(a) a continuous unmodulated sine wave,
(b) an amplitude-modulated wave,
(c) a frequency-modulated wave,
(d) a pulse-modulated wave,
(e) Morse or teleprinter signals;

FIG. 2 shows waveforms of a continuous wave altered in accordance with the principles of this invention to represent the various conditions of a serial code;

FIG. 2*a* shows a wave in which the space signal is represented by an unaltered full cycle and the mark signal is represented by the blanking of positive half cycles;

FIG. 2*b* shows a waveform blanked according to a ternary serial code in which unblanked half cycles correspond to a "zero" condition, and a blanked positive or negative half cycle corresponds to the "yes" or "no" character respectively;

FIG. 2*c* shows a waveform in which a blanked negative half cycle of a full cycle of the sine wave represents a space signal and a blanked positive half cycle of a full cycle of the sine wave represents a mark signal;

The methods of modulation illustrated by FIGS. 1*a*–1*e* are known, as already described briefly hereinbefore.

Figure 1:
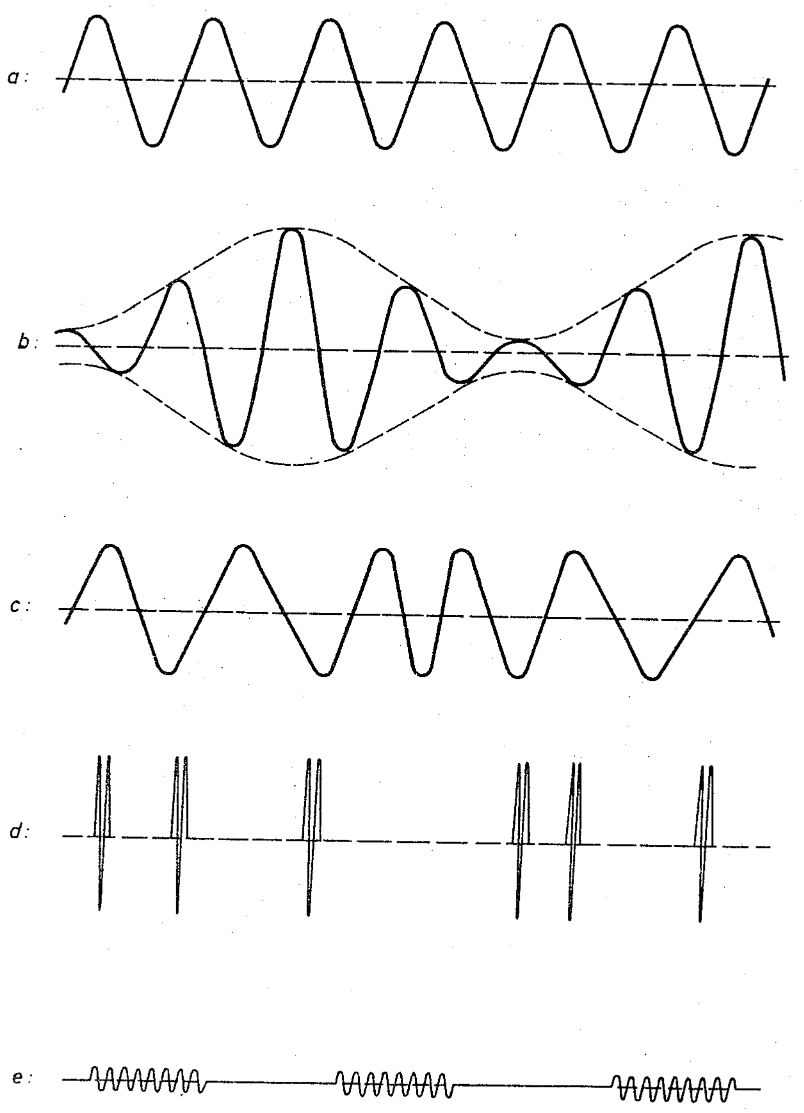
Fig.1 (PRIOR ART)
Figure 2:
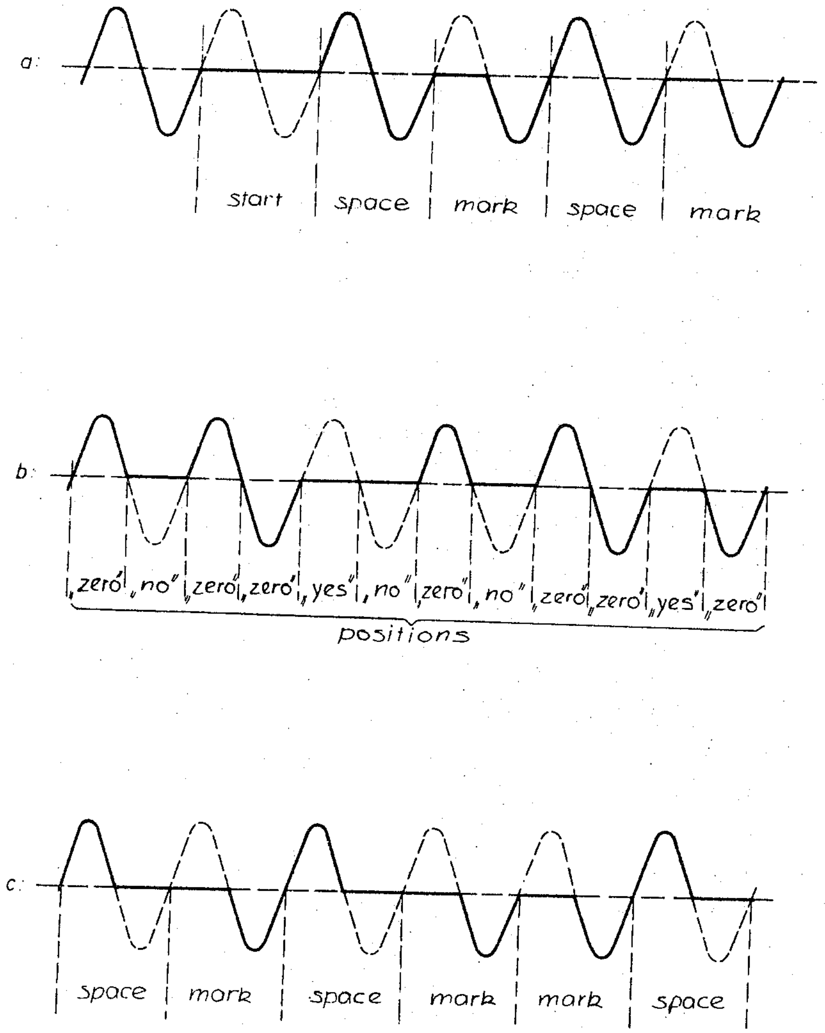

FIG. 2 illustrates a wave blanked according to the invention. FIG. 2*a* represents how a sine wave can be modified to represent marked and space signals. The blanking of half cycles is in general the most suitable way of representing, for instance, the mark signal, but it should be noted that instead of blanking, the amplitude or the curve shape can be modified in any other suitable way. In many cases it is desirable to indicate the beginning of the serial code signal by a start signal. According to the invention a start signal is represented by blanking two successive half cycles, i.e. a positive and a negative half cycle, i.e. therefore, a full cycle.

The wave need not be sinusoidal but can also be of rectangular shape.

Mark signals can moreover be represented by blanking a plurality of successive half cycles having the same polarity.

The modulation method according to the invention is characterized in that the spacing between two mark or space signals, respectively, is always an odd number of half cycles. The fundamental frequency of such a blanked wave can be restituted by coupling said wave to a simple filter, e.g. a parallel resonant circuit or a low pass filter, having this fundamental frequency as the upper cut-off frequency. The fundamental frequency can be coupled from the output of said filter.

FIG. 2*b* illustrates a wave blanked to represent a ternary code. In a ternary code three conditions must be represented, viz. the "yes," the "no" and the "zero" conditions. According to the invention the "yes" condition is represented by blanking positive half cycles, the "no" conditions is represented by blanking negative half cycles, and the "zero" condition is represented by unblanked half cycles. The use of ternary codes and the advantages and disadvantages of the same are sufficiently known. The decoding equipment for ternary coded signals is relatively expensive, so that binary codes are preferred.

FIG. 2*c* shows a wave blanked according to a binary code in a manner similar to FIG. 2*a*. To increase the transmission reliability positive and negative half cycles are blanked alternately, i.e. if a positive half cycle is blanked the succeeding negative half cycle is not blanked, or if a negative half cycle is blanked the preceding positive half cycle is not blanked. This type of coding the wave results in the serially coded wave having constant energy content, independent of the number of the space or the mark signals, because the sum of all positive and negative half cycles has the same value. Such a serially coded wave permits, for example, the control of the gain of sub-station amplifiers by monitoring the constant energy content of the wave.

The bandwidth of a transmission channel is determined in transmission by radio frequency by the bandwidth of the intermediate frequency amplifier of the radio receiver; in the case of carrier frequency transmission the bandwidth is in effect determined by the channel bandwidth. By blanking half cycles of the radio frequency carrier wave the bandwidth of the transmission system would be insufficient. Therefore, according to the invention a modulation wave is modulated upon the radio frequency carrier wave, and in this modulation wave half cycles are blanked according to the invention. The frequency of this modulation wave can be chosen so that the intermediate frequency amplifier bandwidth of the radio receiver or the channel bandwidth of the carrier frequency transmission system, respectively, is wide enough to transmit the information within a predetermined time.

Figure 3:
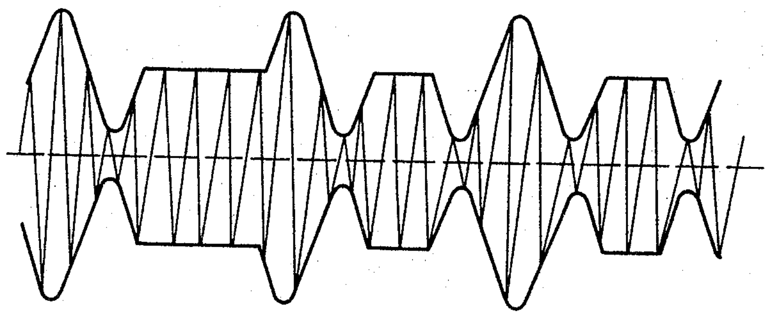
FIG. 3 shows a R.F. carrier wave modulated with the blanked sine wave of FIG. 2*a* according to the invention.

In FIG. 3 an amplitude-modulated carrier signal is shown in which half cycles of the modulation frequency are blanked according to FIG. 2*a*.

Figure 5:
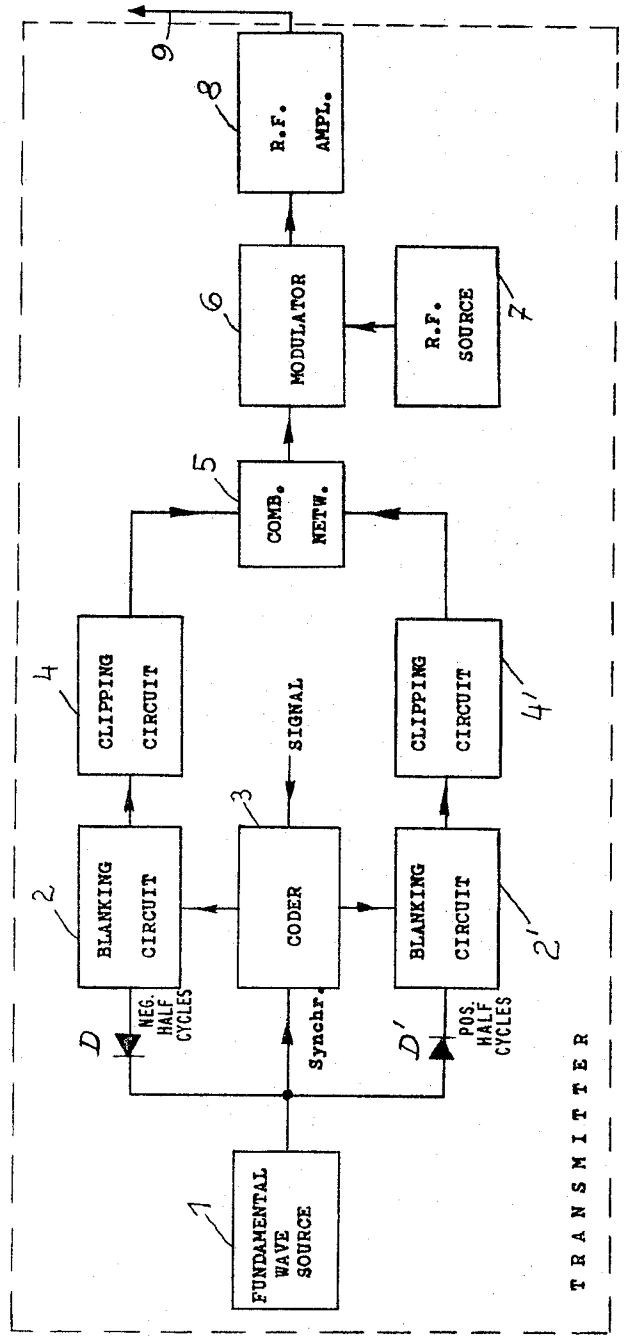
FIGS. 5–7 show examples of arrangements for obtaining waves according to the invention.

In FIG. 5 the circuit arrangement of the system at the transmitting side is shown in block form. It comprises a fundamental wave generator 1 which substantially generates a sine wave of a low frequency of about 10 kcps. Negative and positive half cycles of the low frequency signal are separated by suitable means, e.g. by diodes D and D', respectively. A coder 3 is activated by the serial code signal to be transmitted, and synchronized by the fundamental wave so that the mark and space signals are time coincident and coextensive with full cycles of the fundamental wave. Blanking circuit 2 receives the negative half cycles of the fundamental wave from diode D and responds, for instance, to the space signal to blank out the negative half cycles. Blanking circuit 2' receives the positive half cycles of the fundamental wave from diode D' and responds, for instance, to the mark signal to blank out the positive half cycles. It should be noted that circuit 2 could respond to the mark signal and circuit 2' could respond to the space signal to blank the half cycles coupled thereto. It should be recalled that the mark and space signals are time coincident and coextensive with full cycles of the fundamental wave, therefore, when circuit 2 blanks a negative half cycle due to a space signal, the positive half cycle of the full cycle coincident with the space signal is passed by circuit 2'. This same operation occurs in the presence of a mark signal, that is, circuit 2' blanks the positive half cycle and circuit 2 passes the negative half cycle. The blanking circuits may be electronic switches. The blanked half cycles and unblanked half cycles at the output of circuits 2 and 2' are combined in combining network 5 to form the wave or modulation signal blanked according to the invention. If the blanked wave is desired to have a rectangular shape, clipping circuits 4 and 4' may be inserted between the blanking circuits 2 and 2' and the combining network 5. A R.F. source 7 is modulated by means of a modulator 6 with said blanked wave, obtained at the output of combining network 5. The modulated R.F. wave is amplified by means of a R.F. amplifier 8 and radiated by means of an antenna system 9.

Figure 6:
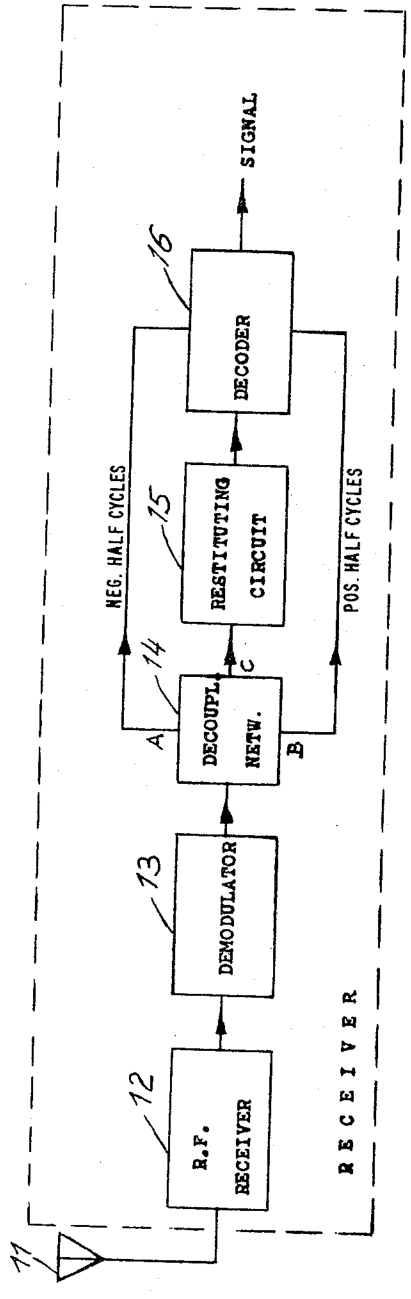

Referring now to FIG. 6, the circuit arrangement of the system at the receiving side is shown in block form. The R.F. waves radiated by antenna 9 of FIG. 5, are received by antenna 11 of FIG. 6 and fed to a receiver 12, which may comprise R.F. amplifier stages, a local oscillator and I.F.-amplifier stages, as well known to those skilled in the art. The output of receiver 12 is fed to a demodulator 13, the output of which is the blanked modulation signal of the same shape as at the output of combining network 5 of FIG. 5. The signal at the output of demodulator 13 is fed into a decoupling network 14. At output terminals A and B of decoupling network 14 negative half cycles and positive half cycles, respectively, are obtained, and applied to a decoder 16. The output at terminal C of decoupling network 14, which is substantially of the same shape as at the output of demodulator 13, is coupled to restitution circuit 15 to recover the fundamental frequency of the blanked wave. The restituted fundamental frequency triggers the decoder 16. At the output of the decoder the original signal is obtained and applied to a suitable utilizing device.

Figure 7:
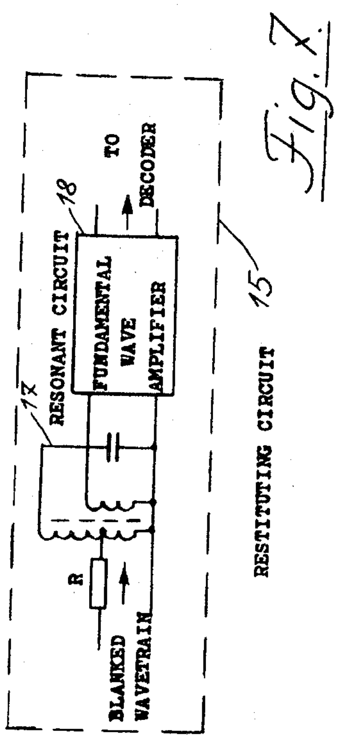

In FIG. 7 an embodiment of the restituting circuit is shown more detailed. A resonant circuit 17 is tuned to the frequency of the fundamental wave. The resonant circuit is of the low-loss type, so that blanked halfwaves are restituted. If needed, the output voltage of resonant circuit 17 may be amplified by a fundamental wave amplifier 18.

Figure 4:
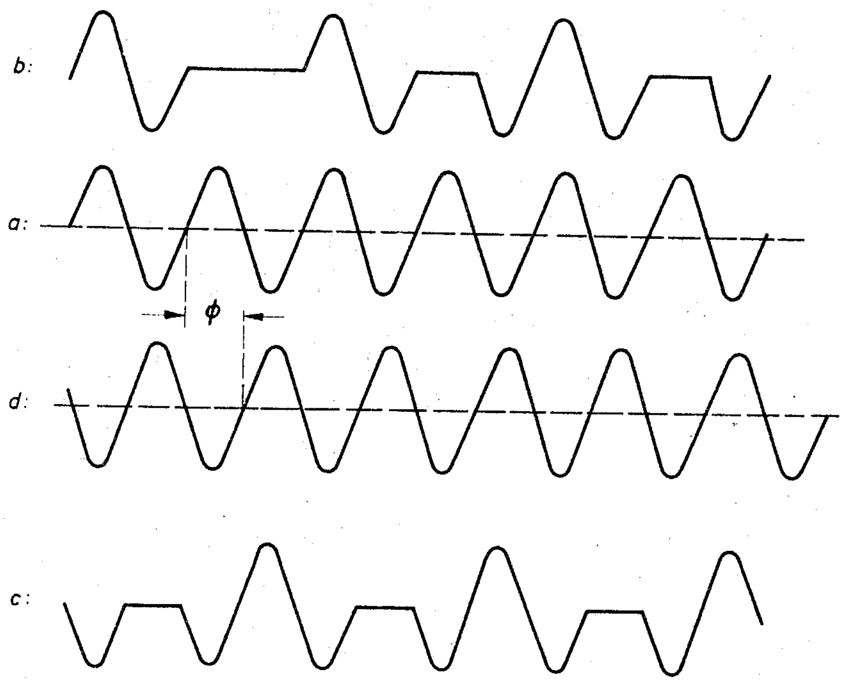
FIG. 4 shows the application of this method to a radio navigation system in which simultaneously the transmission of information and a range determination is accomplished by comparing the phase of the unblanked modulation sine wave with the detected and reconstituted blanked modulation sine wave.

FIG. 4 shows how the modulation system according to the invention is applicable in a most advantageous manner to the field of radio navigation. In this field it is often required to superimpose on a pulse, serving in general for distance determination purposes, another information, such as the identification signal of an aircraft or of a ground station interrogating the aircraft, etc. By the interrogation method for measuring distance between a ground station and aircrafts it is necessary to superimpose on the distance measuring pulse the address of a special aircraft which has to be called, or other coded information being of interest to the aircraft. The aircraft transmits to the ground station within the response pulse other coded information, such as its heading, bearing, altitude and other navigational data.

An example of such data transmission system in connection with a navigation system including range determination according to the well known interrogation method may be operated in the following manner:

The transmitter which generates radio frequency pulses including a plurality of full cycles, is amplitude-modulated with a modulation signal in which half cycles are blanked in the manner described. This modulated pulse is radiated. In the aircraft said pulse is received and detected. At the one hand the serial coded information is decoded and evaluated in a suitable manner. At the other hand the modulation frequency is restituted and new information, if wanted, is impressed on the modulation wave by blanking half cycles as described. Said blanked wave is then amplitude-modulated upon a radio frequency response pulse which is radiated to the ground station. Care is taken that no phase shift occurs between the received and re-radiated modulation frequency. The restitution of the modulation frequency can also be accomplished by synchronizing a modulation frequency generator with the received signal instead of using filters.

At the ground-station the response pulse is received and detected. On one hand the information contained in the detected wave is decoded and evaluated in a suitable manner. On the other hand, the received modulation frequency from the aircraft is restituted and compared in phase with the unblanked modulation frequency of the ground station.

A coarse distance determination between the ground station and the aircraft is given by the time difference of the leading edges of the radiated and received pulses. Moreover a fine distance measuring may be obtained like a vernier-reading by comparing the phase ($\phi$) of the modulation waves within the pulses, as indicated in FIGS. 4*a* and 4*d*.

In FIG. 4 is shown:

(a) the unblanked modulation frequency of the radio frequency pulse, (b) the modulation frequency of FIG. 4*a* blanked according to the invention, (c) the blanked modulation frequency re-radiated as modulation of the radio frequency carrier wave from the aircraft, received and detected at the ground station, (d) the restituted modulation frequency of FIG. 4*c* which has a phase shift $\phi$ with respect to the modulation frequency of FIG. 4*a*.

Briefly, the distance can be determined from this phase shift in a known manner from the fact that a phase shift of a full cycle corresponds to a time delay of $\tau=1/f$, wherein $f$ is the modulation frequency in c.p.s. and from the propagation velocity ($c$) of the electromagnetic waves, the frequency ($f$) and the phase angle ($\phi$), considering that the distance travelled by the electromagnetic waves is double the distance between the ground station and the aircraft.

Figure 8:
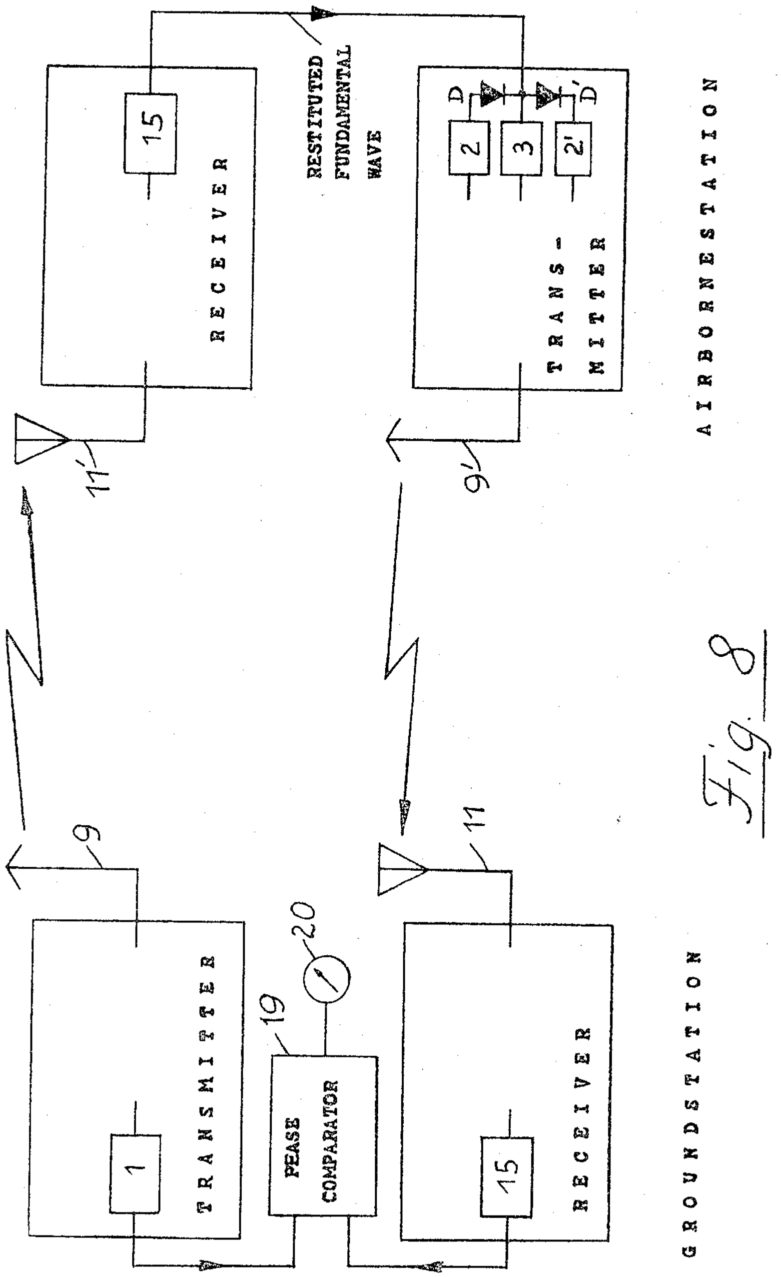
FIG. 8 is a block diagram of a ground station and an airborne station in accordance with this invention.

While with reference to FIG. 4 the philosophy of the system has been described of how periodic sine waves with blanketed half cycles are applicable to navigation systems, FIG. 8 shows the system in block form for fine distance measuring and data transmission in an airborne transponder system for aircraft navigation.

According to FIG. 8 the ground station and the airborne station each comprises a transmitter and a receiver according to FIGS. 5 and 6.

The signal to be transmitted from the ground station, coded according to the invention, is received in the airborne receiver. The restituted fundamental wave, recovered by restituting circuit 15, replaces the fundamental frequency, normally generated by fundamental wave generator 1 of the transmitting arrangement. Thus, the fundamental wave train transmitted by the ground station is restituted, coded with new information and transmitted from the aircraft to the ground station. The restituting circuit 15 of the ground receiver produces a restituted fundamental wave, which has a delay time with respect to the fundamental wave, generated by fundamental wave source 1, corresponding to the distance between the ground station and the aircraft. Both fundamental waves are phase-compared in a phase comparator 19, so that a fine distance measuring is obtained, and indicated by a meter 20.

For the transmission of serially coded information between aircrafts and a ground station by blanking half cycles according to the invention, the 2000 c.p.s. power supply of the aircrafts may be used as modulation frequency.

While the principles of the invention have been described above in connection with specific embodiments and particular modifications thereof, it is to be clearly understood that this description is made only by way of example and not as a limitation on the scope of the invention.

We claim:

1. A system for transmitting information by means of a serial code comprising:
first means for generating a continuous periodic wave;
a source of serial code including time sequential mark and space signals, each of said mark and space signals being time coincident and coextensive with a different full cycle of said periodic wave;
second means coupled to said first means and said source responsive to one of said mark and space signals to blank the positive half cycle of said full cycle associated with said one of said mark and space signals and responsive to the other of said mark and space signals to blank the negative half cycle of said full cycle associated with said other of said mark and space signals to code said periodic wave;
third means coupled to said second means responsive to said coded periodic wave to restitute said periodic wave; and
fourth means coupled to said second means and said third means responsive to said coded periodic wave and said restituted periodic wave to recover said serial code.

2. A system according to claim 1, wherein
said first means is coupled to said source for synchronization thereof to assure said time coincident and coextensive relationship between said mark and space signals and different full cycles of said periodic wave.

3. A system according to claim 1, wherein
said second means includes
fifth means coupled to said first means to pass only the positive half cycles of said periodic wave,
sixth means coupled to said first means to pass only the negative half cycles of said periodic wave,
seventh means coupled to said fifth means and said source responsive to said one of said mark and space signals to blank said positive half cycle and to pass the positive half cycle of said full cycle associated with said other of said mark and space signals,
eighth means coupled to said sixth means and said source responsive to said other of said mark and space signals to blank said negative half cycle and to pass the negative half cycle of said full cycle associated with said one of said mark and space signals, and
ninth means coupled to said seventh and eighth means to combine the resultant output signals therefrom to provide said coded periodic wave.

4. A system according to claim 3, wherein
said fifth means includes
a diode coupled to said first means in a conduction direction to pass only said positive half cycles of said periodic wave.

5. A system according to claim 3, wherein
said sixth means includes
a diode coupled to said first means in a conduction direction to pass only said negative half cycles of said periodic wave.

6. A system according to claim 1, wherein
said coded periodic wave has a fundamental frequency equal to the frequency of said periodic wave; and
said third means includes
circuit means having a frequency response at said fundamental frequency to restitute said periodic wave.

7. A system according to claim 1, further comprising
fifth means coupled to said second means to propagate said coded periodic wave, and
sixth means coupled to said fifth means, said third means and said fourth means to receive said propagated coded periodic wave.

8. A system according to claim 7, wherein said coded periodic wave has a fundamental frequency equal to the frequency of said periodic wave; and said third means includes circuit means having a frequency response at said fundamental frequency to restitute said periodic wave.

9. A system according to claim 7, wherein said fifth means includes a source of carrier signal, an amplitude modulation means coupled to said source of carrier signal and said second means to amplitude modulate said carrier signal with said coded periodic wave, and radiation means coupled to said modulation means to propagate said amplitude modulated carrier signal;

said sixth means includes eighth means coupled to said radiation means to receive said amplitude modulated carrier signal, and ninth means coupled to said eighth means to demodulate said amplitude modulated carrier signal to recover said coded periodic wave; and said third and fourth means are coupled to said ninth means.

10. A system according to claim 9, wherein said coded periodic wave has a fundamental frequency equal to the frequency of said periodic wave; and said third means includes circuit means having a frequency response at said fundamental frequency coupled to said ninth means to restitute said periodic wave.

11. A system according to claim 1, wherein said second means includes fifth means coupled to said first means to pass only the positive half cycles of said periodic wave, sixth means coupled to said first means to pass only the negative half cycles of said periodic wave, seventh means coupled to said fifth means and said source responsive to said one of said mark and space signals to blank said positive half cycle and to pass the positive half cycle of said full cycle associated with said other of said mark and space signals, eighth means coupled to said sixth means and said source responsive to said other of said mark and space signals to blank said negative half cycle and to pass the negative half cycle of said full cycle associated with said one of said mark and space signals, and ninth means coupled to said seventh and eighth means to combine the resultant output signals therefrom to provide said coded periodic wave;

said coded periodic wave has a fundamental frequency equal to the frequency of said periodic wave; and said third means includes a source of carrier signal, an amplitude modulation means coupled to said source of carrier signal and said ninth means to amplitude modulate said carrier signal with said coded periodic wave, radiation means coupled to said modulation means to propagate said amplitude modulated carrier signal, tenth means coupled to said radiation means to receive said amplitude modulated carrier signal, eleventh means coupled to said tenth means to demodulate said amplitude modulated carrier signal to recover said coded periodic wave, and circuit means having a frequency response at said fundamental frequency coupled to said eleventh means to restitute said periodic wave.

12. In a system for transmitting information by means of a serial code, a transmitter comprising:

first means for generating a continuous periodic wave;

a source of serial code including time sequential mark and space signals, each of said mark and space signals being time coincident and coextensive with a different full cycle of said periodic wave;

second means coupled to said first means and said source responsive to one of said mark and space signals to blank the positive half cycle of said full cycle associated with said one of said mark and space signals and responsive to the other of said mark and space signals to blank the negative half cycle of said full cycle associated with said other of said mark and space signals to code said periodic wave; and third means coupled to said second means to propagate said coded periodic wave.

13. A transmitter according to claim 12, wherein said third means includes a source of carrier signal, an amplitude modulation means coupled to said source of carrier signal and said second means to amplitude modulate said carrier signal with said coded periodic wave, and radiation means coupled to said modulation means to propagate said amplitude modulated carrier signal.

14. A transmitter according to claim 12, wherein said second means includes fourth means coupled to said first means to pass only the positive half cycles of said periodic wave, fifth means coupled to said first means to pass only the negative half cycles of said periodic wave, sixth means coupled to said fourth means and said source responsive to said one of said mark and space signal to blank said positive half cycle and to pass the positive half cycle of said full cycle associated with said other of said mark and space signals, seventh means coupled to said fifth means and said source responsive to said other of said mark and space signals to blank said negative half cycle and to pass the negative half cycle of said full cycle associated with said one of said mark and space signals, and eighth means coupled to said sixth means and seventh means to combine the resultant output signals therefrom to provide said coded periodic wave.

15. A transmitter according to claim 14, wherein said third means include a source of carrier signal, an amplitude modulation means coupled to said source of carrier signal and said eighth means to amplitude modulate said carrier signal with said coded periodic wave, and radiation means coupled to said modulation means to propagate said amplitude modulated carrier signal.

16. In a system for transmitting information by means of a serial code including time sequential mark and space signals which are represented in a continuous periodic wave of given frequency having each full cycle thereof time coincident and coextensive with a different mark and space signal, said periodic wave being coded by blanking a negative half cycle associated with one of said mark and space signals and by blanking a positive half cycle associated with the other of said mark and space signals, a receiver comprising:

a source of said coded periodic wave;

a first means coupled to said source responsive to said coded periodic wave to restitute said periodic wave; and second means coupled to said source and said first means responsive to said coded periodic wave and said restituted periodic wave to recover said serial code.

17. A receiver according to claim 16, wherein
said coded periodic wave has a fundamental frequency equal to said given frequency of said periodic wave; and
said first means includes
circuit means having a frequency response at said fundamental frequency to restitute said periodic wave.

18. A receiver according to claim 16, wherein
said source includes
third means to receive a carrier signal amplitude modulated by said coded periodic wave, and
fourth means coupled to said third means to demodulate said amplitude modulated carrier signal to recover said coded periodic wave.

19. A receiver according to claim 18, wherein said coded periodic wave has a fundamental frequency equal to said given frequency of said periodic wave; and
said first means includes
circuit means having a frequency response at said fundamental frequency coupled to said fourth means to restitute said periodic wave.

References Cited by the Examiner

UNITED STATES PATENTS

| | | | |
|---|---|---|---|
| 3,102,238 | 8/1963 | Bosen | 325—30 |
| 3,112,448 | 11/1963 | McFarlane | 325—30 |
| 3,223,925 | 12/1965 | Florac | 325—30 |

DAVID G. REDINBAUGH, *Primary Examiner*.

S. J. GLASSMAN, J. T. STRATMAN, *Assistant Examiners*.